(12) United States Patent  (10) Patent No.: US 7,886,218 B2
Watson  (45) Date of Patent: *Feb. 8, 2011

(54) METHODS AND DEVICES FOR POST PROCESSING RENDERED WEB PAGES AND HANDLING REQUESTS OF POST PROCESSED WEB PAGES

(75) Inventor: Derek John Watson, Johnsonville (NZ)

(73) Assignee: Aptimize Limited, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,476

(22) Filed: Dec. 14, 2009

(65) Prior Publication Data

US 2010/0077294 A1   Mar. 25, 2010

Related U.S. Application Data

(63) Continuation of application No. 12/137,126, filed on Jun. 11, 2008.

(30) Foreign Application Priority Data

Feb. 27, 2008   (NZ) ..................................... 566291

(51) Int. Cl.
G06F 17/00 (2006.01)
(52) U.S. Cl. ..................................... 715/206; 715/241
(58) Field of Classification Search ................. 709/201, 709/203, 217, 218, 219, 223, 224, 225, 226, 709/230, 235, 205, 206, 208, 236, 241; 711/113; 715/205, 206, 208, 234, 235, 236, 241
See application file for complete search history.

(56) References Cited

U.S. PATENT DOCUMENTS

| | | | |
|---|---|---|---|
| 5,778,372 A | 7/1998 | Cordell et al. | |
| 6,366,947 B1 | 4/2002 | Kavner | |
| 6,393,526 B1 | 5/2002 | Crow et al. | |
| 6,526,439 B1 | 2/2003 | Rossmann et al. | |
| 6,553,393 B1 | 4/2003 | Eilbott et al. | |
| 6,615,267 B1 | 9/2003 | Whalen et al. | |
| 6,782,427 B1 | 8/2004 | Van Andel et al. | |

(Continued)

FOREIGN PATENT DOCUMENTS

WO   WO 01/19052 A2   3/2001

(Continued)

OTHER PUBLICATIONS

Online, ASP.NET, AJAX Control Toolkit, http:www.asp.net/AJAX/AjaxControlToolkit/Samples/Walkthrough/OtherNeatStuff.aspx, Microsoft Corporation, 2006-2007, Downloaded Feb. 5, 2008, 3 Sheets.

(Continued)

*Primary Examiner*—Laurie Ries
(74) *Attorney, Agent, or Firm*—Nixon & Vanderhye P.C.

(57) ABSTRACT

A method of post processing a rendered HTML web page includes receiving a rendered web page, parsing the web page to identify resources that the web page includes links to, grouping the identified resources according to a type of resource, creating a resource reference that refers to each group of resources, and inserting the resource reference into the web page to enable the identified resources in the web page to be retrieved.

20 Claims, 6 Drawing Sheets

U.S. PATENT DOCUMENTS

| | | | |
|---|---|---|---|
| 6,886,136 B1 | 4/2005 | Zlotnick et al. | |
| 6,907,429 B2 | 6/2005 | Carneal et al. | |
| 6,993,591 B1 | 1/2006 | Klemm | |
| 7,003,565 B2* | 2/2006 | Hind et al. | 709/224 |
| 7,054,917 B1 | 5/2006 | Kirsch et al. | |
| 7,107,526 B1 | 9/2006 | Weller | |
| 7,231,644 B2 | 6/2007 | Kieffer | |
| 7,287,018 B2* | 10/2007 | Lennon | 707/694 |
| 7,290,285 B2* | 10/2007 | McCurdy et al. | 726/27 |
| 7,349,955 B1 | 3/2008 | Korb et al. | |
| 7,398,463 B2 | 7/2008 | Bernstein et al. | |
| 7,613,997 B2 | 11/2009 | Kaler et al. | |
| 7,636,770 B2* | 12/2009 | Bennett et al. | 709/219 |
| 2001/0037400 A1 | 11/2001 | Raz et al. | |
| 2002/0065741 A1* | 5/2002 | Baum | 705/26 |
| 2002/0073235 A1* | 6/2002 | Chen et al. | 709/246 |
| 2003/0237052 A1 | 12/2003 | Danielsson et al. | |
| 2004/0015542 A1 | 1/2004 | Anonsen et al. | |
| 2004/0088375 A1 | 5/2004 | Sethi et al. | |
| 2004/0215665 A1 | 10/2004 | Edgar et al. | |
| 2005/0182826 A1 | 8/2005 | Knittel et al. | |
| 2006/0036955 A1* | 2/2006 | Baudisch et al. | 715/747 |
| 2006/0041827 A1 | 2/2006 | Yamaoka et al. | |
| 2006/0218487 A1 | 9/2006 | Ross et al. | |
| 2007/0192684 A1 | 8/2007 | Bodin et al. | |
| 2007/0214134 A1* | 9/2007 | Haselden et al. | 707/6 |
| 2008/0018658 A1 | 1/2008 | Bruno et al. | |
| 2008/0139191 A1* | 6/2008 | Melnyk et al. | 455/419 |
| 2008/0141116 A1* | 6/2008 | Mohan | 715/236 |
| 2008/0228920 A1 | 9/2008 | Souders et al. | |
| 2008/0244427 A1 | 10/2008 | Narayanan et al. | |
| 2008/0288486 A1* | 11/2008 | Kim et al. | 707/5 |
| 2009/0024574 A1* | 1/2009 | Timmons | 707/3 |

FOREIGN PATENT DOCUMENTS

| | | |
|---|---|---|
| WO | WO 2007/098014 A2 | 8/2007 |

OTHER PUBLICATIONS

Online, Acid Drop, http://aciddrop.com/2008/01/21/boost-your-website-load-time-with-3-lines-of-code/, Jan. 2008, Downloaded Feb. 5, 2008, 5 Sheets.

Online, CSS Sprite Generator, http://launchpad.net/css-sprite-generator/, Canonical Ltd., Version 1.2.4, 2004-2008, Downloaded Feb. 5, 2008, 2 Sheets.

Online, Wim Leers Freelance Drupal Developer, Improving Drupal's Page Loading Performance, http://wimleers.com/article/improving-drupals-page-loading-performance#rule-1, Jan. 30, 2008, 7 Sheets.

Online, Scott Becker, Synthesis, Asset Packager—JavaScript and CSS Asset Compression for Production Rails Apps, http://synthesis.sbecker.net/pages/asset_packager, Downloaded Feb. 5, 2008, 3 Sheets.

Online, Dario Solera, HTTP Compression—A Quick and Dirty Solution, http://www.codeproject.com/KB/aspnet/httpcompression.aspx?print=true, Jul. 11, 2006, 3 pages.

Takahashi, "Metalevel Links: More Power to Your Links," ACM Press Books, 1998, 3 pages.

Yin et al., "Using Link Analysis to Improve Layout on Mobile Devices," WWW 2004, May 17-22, 2004, New York, NY, pp. 338-344.

Wills et al., "N for the Price of 1: Bundling Web Objects for More Efficient Content Delivery," WWW10, May 1-5, 2001, Hong Kong, pp. 257-264.

Housel et al., "WebExpress: A Client/Intercept Based System for Optimizing Web Browsing in a Wireless Environment," Mobile Networks and Applications 3, 1998, pp. 419-431.

Ghosh et al., "Performance of Dynamic Web Page Generation for Database-Driven Web Sites," Proceedings of the International Conference on Next Generation Web Services Practices, Sep. 25-28, 2006, pp. 56-63.

Chi et al., "Accelerating Web Page Retrieval Through Object Usage Declaration," Simulation Symposium, Apr. 18-22, 2004, pp. 104-111.

Xiao et al., "Web Page Adaptation for Mobile Device," 4th International Conference on Wireless Communications, Networking and Mobile Computing, WiCOM '08, Oct. 12-14, 2008, pp. 1-5.

* cited by examiner

METHODS AND DEVICES FOR POST PROCESSING RENDERED WEB PAGES AND HANDLING REQUESTS OF POST PROCESSED WEB PAGES

CROSS REFERENCE TO RELATED APPLICATIONS

This application is a continuation of U.S. application Ser. No. 12/137,126, filed Jun. 11, 2008, which claims priority to New Zealand Application 566291, filed Feb. 27, 2008, the entire contents of both being incorporated herein by reference.

FIELD OF THE INVENTION

The present invention relates to methods and devices for post processing rendered web pages and handling requests of post processed web pages. In particular, the present invention relates to a method and device for post processing a rendered HTML page in order to insert a resource reference that enables resources identified in the web page to be retrieved, and a method and device for handling a resource request containing such a resource reference.

BACKGROUND

When a browser requests a webpage from a web server there is usually some inherent latency due to the need for the web browser to request each resource identified in the web page. This latency is caused by the web browser being required to individually request each resource as the web browser comes across the request for the resource during the rendering stage.

The basic steps involved in displaying a web page on a browser include the web browser requesting a page from the web server.

The web server then determines which web application is to handle the request, e.g. asp, php, jsp etc. A request is made by the web server to the determined web application to render the page. The web application renders the page content and streams it back to the web server.

The rendering of a page involves the execution of code to transform a template specification for the page into browser readable content (typically HTML, but not restricted to this only).

At this point the assembled page may include links to a number of additional resources that supplement the text content, such as images and script code (<script src="url" . . . > and <img src="url" . . . >), as well as other resources such as CSS references (<link type="text/css" href="url" . . . >).

For a standard web page, the page content is sent back to the browser with all the resources referenced individually in the HTML.

Upon receipt of the web page, the browser parses the content looking for other resource links and requests each resource in turn from the web server as the browser renders the page. Each of these requests causes the web server to pass the request onto the web application or stream a file from the file system. This causes a latency problem since each resource has the request/response time of the connection in addition to the raw data transfer time.

FIG. 1 shows a flow diagram of the first stage of a browser requesting a web page from a web server.

The process includes a web browser requesting a web page from the web server. The web server then either streams the page back if static, or if dynamic then requests the page from a web application. The web application renders the requested web page by accessing the page data and including any links to resources within the web page. The page content is then rendered. The web application then streams the rendered web page back to the web server, which in turn renders the web page back to the web browser via the Internet.

FIG. 2 shows a flow diagram of the second stage wherein a browser renders the HTML page received from the web server.

As the web browser renders the web page, in order to display the web page, the page content is parsed by the browser. When the browser finds a link in the web page that references a resource, that resource is requested. For example, if the web browser parses a first reference to a style sheet, it makes a request to the web server for that style sheet. The web server then fetches the style sheet. Each time that the web browser sees another link to a resource reference, a further request is made to the server and a further fetch cycle is carried out to retrieve the resource. The same steps occur when the browser finds links to each script that is required, and links to each image referenced in the web page.

The requirement for the web server to make separate requests for each resource identified or referenced in the web page causes a delay or latency in the system.

Once all the resources have been retrieved from their various sources, the complete web page is displayed.

In an attempt to reduce the latency, it is known for software developers to explicitly and manually concatenate resource content according to its type where it is static, for example, when the resource content is JavaScript or cascading style sheets (CSS). This type of combining is only carried out at the development stage when the web page is being built, and so does not allow web pages that have not been explicitly built in this manner to be adapted to reduce latency at a later time.

It is also known that some components, such as compiled Ajax and JavaScript libraries etc, are able to dynamically emit script, and allow all scripts that it generates to be combined into a single resource. Each type of component however is only able to control the resources that the component is aware of and so the grouping in this manner only allows a single request to be made for all scripts of that particular component. As a result, it is still a requirement and common practice to use multiple components. These multiple components also result in multiple resource requests from the browser when the HTML web page is rendered.

It is also known to combine, compress and cache resources as the function of a component, but again this requires effort on behalf of the developer to specifically manually identify those resources to be combined and compressed at the time when they write the software. Also, this approach is limited for use when combining static resources, so it is not possible to have this apply to the dynamic resource references emitted by the components previously mentioned.

In WO 01/19052 a system is described wherein the scripting language content in a web page to be transmitted is reduced by compressing the content.

In U.S. Pat. No. 7,054,917 a method is described that attempts to reduce latency by combining uniform resource locator (URL) requests associated with advertisement servers into one request.

In US Patent Application Publication 2004/215665 a system is described that reduces the amount of data being transmitted by combining, compressing and transcoding HTML data before transmitting the data to a client device.

None of the above prior art documents teach a system that enables the reduction of latency of existing web pages. Further, there is no known method of automatically and dynamically arranging image resource requests in a rendered HTML web page such that those image resources can be requested in a single request from the web page as it is being rendered.

SUMMARY

The present invention aims to overcome, or at least alleviate, some or all of the afore-mentioned problems, or to at least provide the public with a useful choice.

In one embodiment, a method of post processing a rendered HTML web page includes receiving a rendered web page, parsing the web page to identify resources that the web page includes links to, grouping the identified resources according to a type of resource, creating a resource reference that refers to each group of combined resources, and inserting the resource reference into the web page to enable the identified resources in the web page to be retrieved.

In another embodiment, a method of handling a resource request from a web browser, wherein the request includes a resource reference that refers to a group of resources of one type, includes receiving the resource request, requesting at least two of the resources in the group, combining the at least two resources, and sending the combined resources to the web browser.

In yet another embodiment, a module is arranged to post process a rendered HTML web page, wherein the module is arranged to receive a rendered web page, parse the web page to identify resources that the web page includes links to, group the identified resources according to a type of resource, create a resource reference that refers to each group of resources, and insert the resource reference into the web page to enable the identified resources in the web page to be retrieved.

In yet a further embodiment, a module is arranged to handle a resource request from a web browser, wherein the request includes a resource reference that refers to a group of resources of one type, the module arranged to receive the resource request, request at least two of the resources in the group, combine the at least two resources, and send the combined resources to the web browser.

In yet a still further embodiment, a data structure forming part of a HTML web page data structure for transmission between a web server and a web browser includes a single resource reference that refers to a group of resources of one type.

BRIEF DESCRIPTION OF THE DRAWINGS

Embodiments will now be described, by way of example only, with reference to the accompanying drawings, in which.

DETAILED DESCRIPTION

Figure 1:
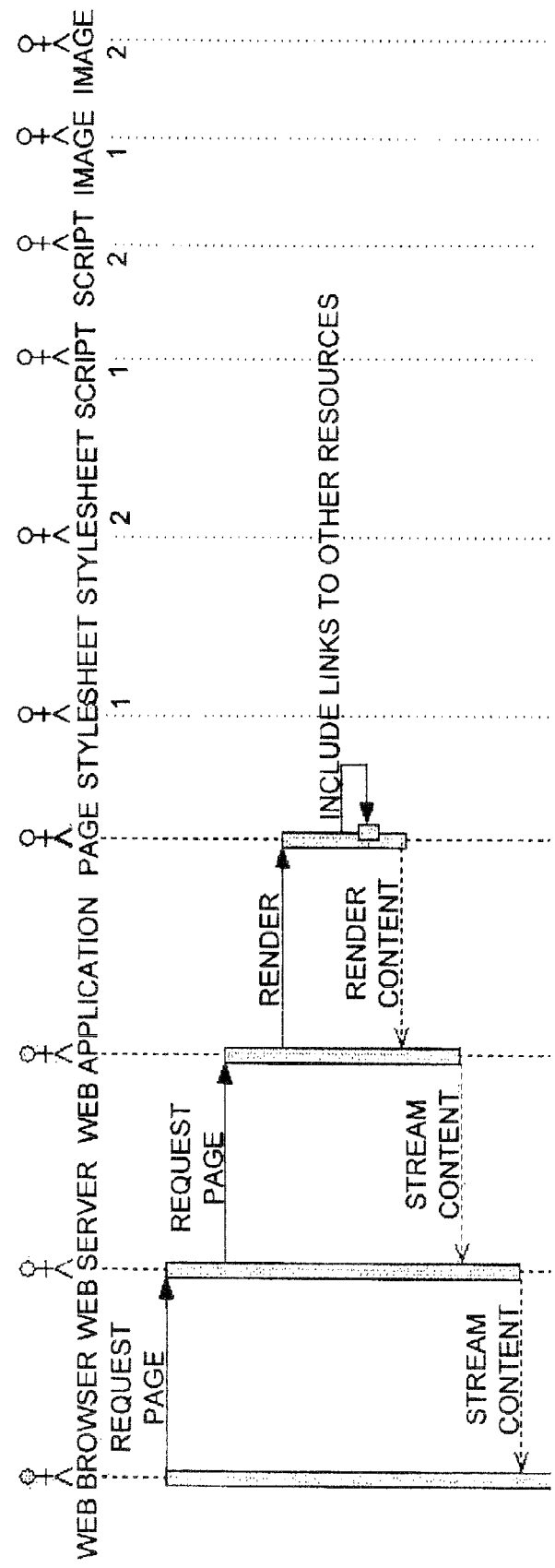
FIG. 1 shows a flow diagram of the known processing steps of rendering a HTML web page after it is requested by a web browser.
Figure 2:
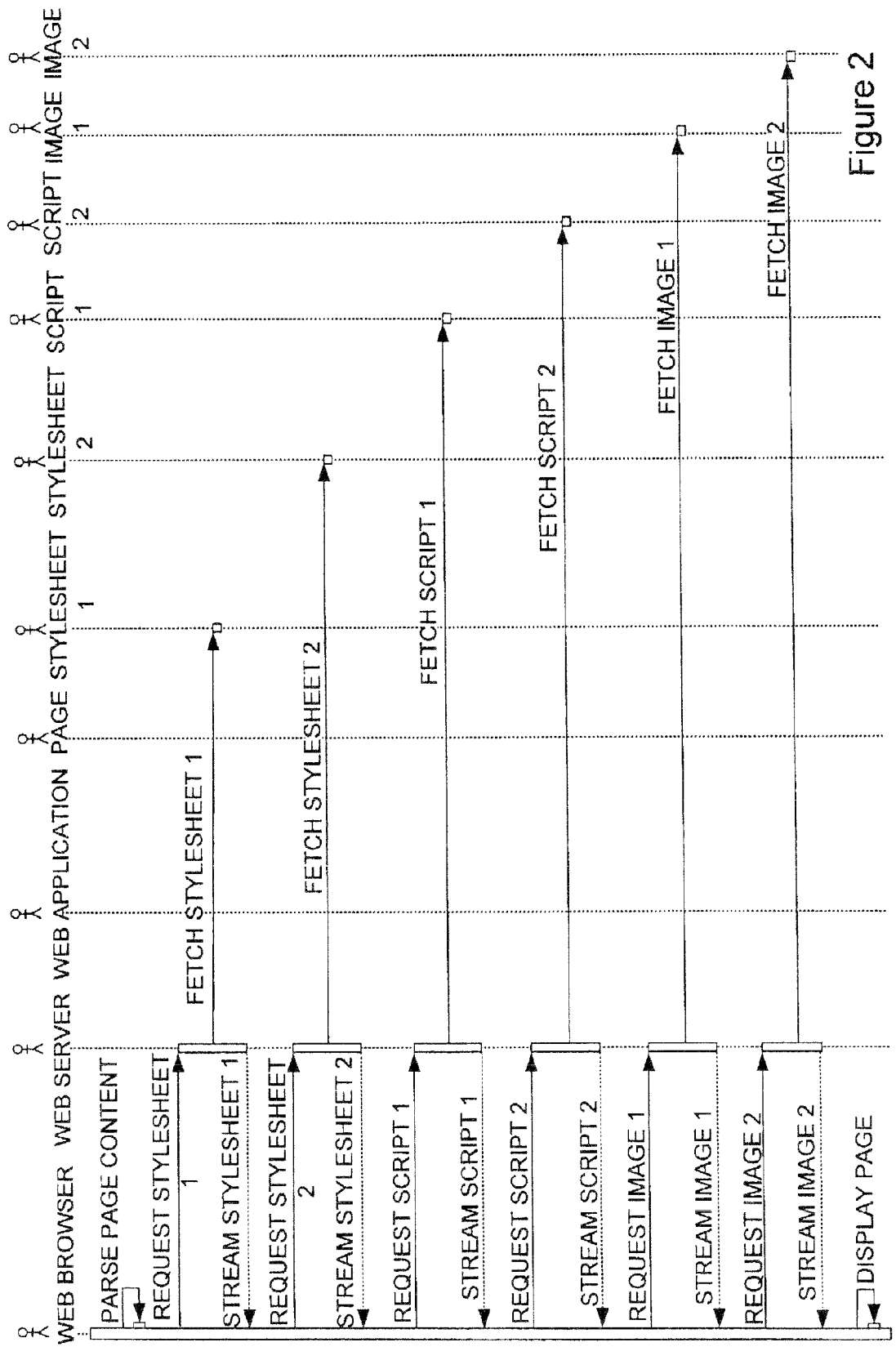
FIG. 2 shows a further flow diagram of the known processing steps of a web browser requesting various resources within a HTML web page.
Figure 3:
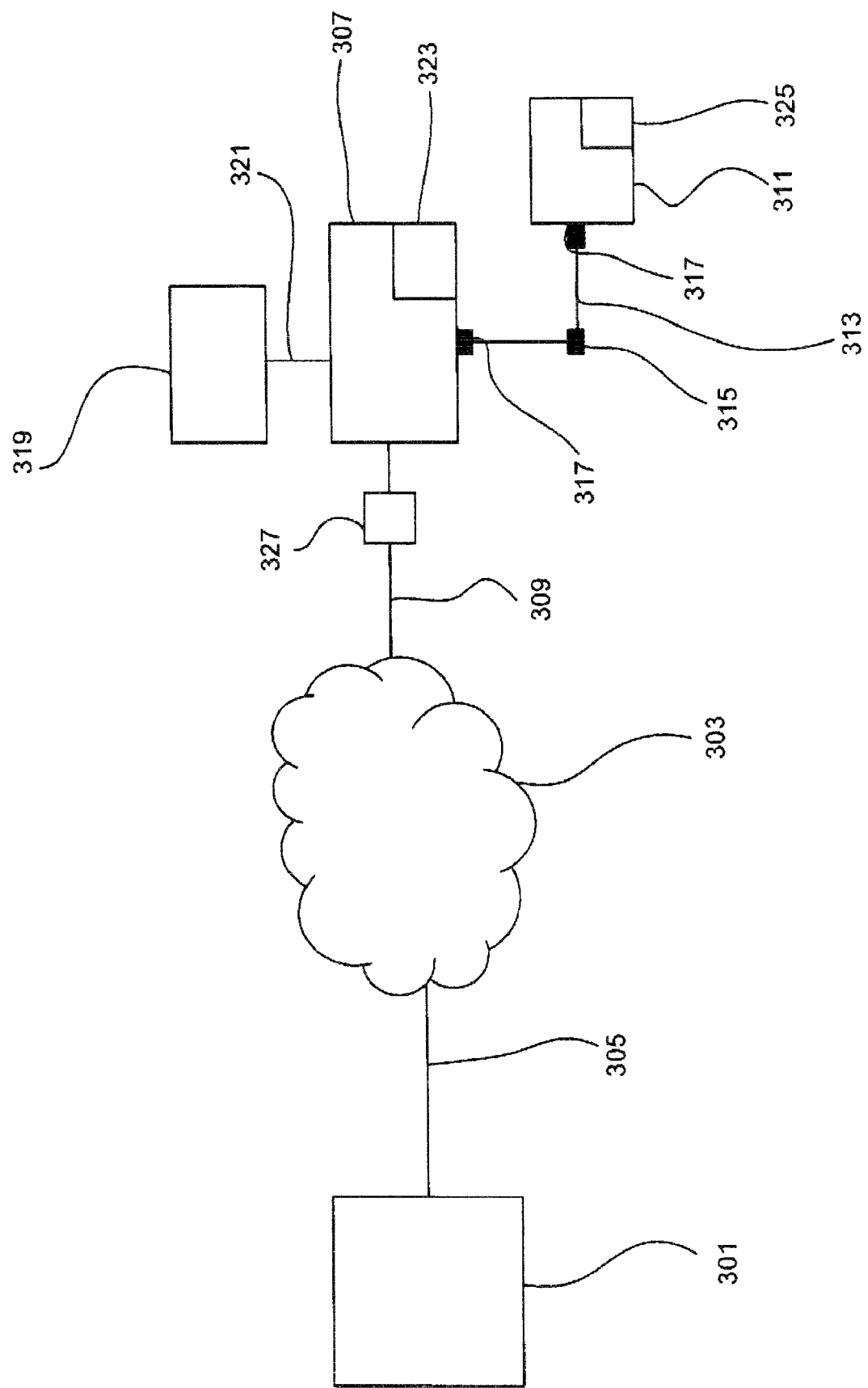
FIG. 3 shows a system block diagram indicating various configurations of a system that may utilise various embodiments of the present invention.

FIG. 3 shows a system block diagram indicating various components that may be used in this embodiment.

A web browser 301 is connected to the Internet 303 via any suitable interface 305. The interface may be a wireless or wired modem, and the connection may be any suitable connection such as a dial up connection or broadband connection. Further, the connection may be via any suitable telecommunications network, for example a 3G network, using a handheld portable device such as a mobile telephone or PDA. The browser may be running on any type of computing device, such as a personal computer, mobile telephone, personal organiser, laptop etc.

The Internet 303 is also connected to a web server 307 via a web server/Internet interface 309. The web server may be any suitable server that can serve HTML web pages, such as an Apache server, for example. A web application 311 forms part of, or is connected to, the web server via a web application/web server interface 313. The web application may be any suitable type of web application, such as, for example, PHP or ASP.NET web applications.

On the interface 313 between the web application and web server there may be other required modules, such as a filter module 315, or interface modules 317 for interfacing between the web server, filter and application.

Forming part of the web server 307, or as a stand alone system, there is a file system 319 that contains the static content of the web pages the server is in control of. The file system 319 is interfaced to the web server via the file system web/server interface 321.

Also shown in FIG. 3 are module 323 forming part of the web server and module 325 forming part of the web application. These modules may be internal hardware modules, software modules or a combination thereof. The modules are arranged to carry out the methods as described below. It will be understood that only one module (323, 325) is required but that more than one module may be utilised to execute different elements of the disclosed method.

In addition, a proxy server 327 may be used that can receive requests from the browser 301 via the internet 303, and optionally modify the requests before passing on to the web server 303 for handling. The proxy server 327 may also return data direct from a cache rather than passing on the request to the web server 303. It should be appreciated that the proxy server may be used to implement the methods of the various embodiments described herein.

Further, it should be appreciated that the module arranged to carry out the methods described herein may also form part of the interface between the web server and web application, the interface modules 317 or the filter module 315. The module may be registered with either the web server or the web application.

Further, it should be appreciated that if the web pages that the server is arranged to serve only contain static resources, then there is no requirement to include the web application, or the interface and components between the web application and the web server.

In addition, it should be appreciated that additional components may be used such as an external database for retrieving additional information.

In the specific embodiment described herein, a device in the form of a software module 323 is located within the web server 307 in order to implement this embodiment.

Once a web application (e.g. asp.net) has compiled the requested web page and the web application is about to stream page content to the web server, the assembled web page is parsed by a resource combiner developed to optimise the references to other resources.

The parsing stage begins by locating the HEAD and BODY sections of the web page. For each section identified, the resources within that section and their type are identified. The different resource types (e.g. CSS and JavaScript) are processed separately, but follow the same process.

As the parser finds each candidate resource for combining, it checks a table of explicitly excluded resources and if the resource found in the page matches an entry in this table (by a fuzzy match) then that resource is excluded. For example, specific resources may be excluded because it is known that that resource will constantly be changing and so will need to be requested separately each time the web page requests that resource. For example, the parser may check for specific words that indicate the resource is constantly changing. Alternatively, specific URLs or parts thereof may be excluded, such as URL's to search engines or online encyclopaedias.

For those resources that are not excluded, the HTML content fragment within the page that represents the link is removed, and the link is kept for reference in the next step of the process.

When the full page has been parsed, all resource references that were found and selected to be combined are stored persistently (as a file on disk or in a database) along with a numeric token as a unique resource identification that acts as a unique identifier for the URL of that resource.

A surrogate URL (uniform resource locator) is then created that identifies all resources of a particular type that are to be combined by their numeric tokens. The order in which the resources appeared in the page is also retained in the order that the numeric tokens appear in this surrogate URL which ensures the order dependant script functions still function.

Example of what the resource combiner stores as resources to be combined after parsing a page:

| CSS |
| --- |
| 1  http://nameofsite/layout/master.css |
| 2  http://nameofsite/layout/common.css |
| 3  http://nameofsite/layout/homestyles.css |
| 4  http://nameofsite/layout/iefixes.css |
| Script |
| 5  http://nameofsite/scripts/common.js |
| 6  http://nameofsite/scripts/prototype.js |
| 7  http://nameofsite/ScriptResource.axd?d=XyayXYyefyuewoijeVJYU |
| 8  http://nameofsiteScriptResource.axd?d=wuiwhecuihCEWYGWuytg |
| 9  http://nameofsite/ScriptResource.axd?d=iojoirebpzouHW |
| 10 http://www.google-analytics.com/urchin.js |

This surrogate URL includes the numeric tokens for each of the 10 resources found in the parsed html page in a single URL.

For example, if 10 style sheets were found, the surrogate URL would be: http://nameofsite/combiner.axd?m=text.css|1.4.10389|1,2,3,4,5,6,7,8,9,10.

The parser then determines an appropriate injection point in the modified page content (that now has the individual resource references removed) to insert the surrogate URL. For style sheets, this is the location of the first style sheet that was selected in the page for combining. For scripts, this is either the location of the first script that appears in the body tag, or where there are no scripts that exist within the body tag, the first occurrence of a script tag in the head tag. The surrogate URL is then inserted into the page at this point.

Therefore, once the whole web page has been parsed, a list of surrogate URL's will exist within it, one surrogate URL for each of the types of resource. That is, a single surrogate URL is provided for style sheets, and another one for script references. All excluded resources still remain unmodified within the page.

When the web browser reads the re-written page, at the point when it comes across the surrogate URL that has been inserted into the page, it requests the surrogate URL from the web server which in turn passes the request to the resource combiner component.

If the content that the surrogate URL represents has not been cached, i.e. if a combined version of the content associated with that surrogate URL is not stored in temporary memory, the following process is carried out to retrieve the identified resources.

The resource combiner handler receives the request for the surrogate URL from the web browser. The handler expands the surrogate URL into a list of real URLs that point to the individual resources. That is, if the surrogate URL included the numeric tokens of 5 different style sheets and 5 different script files, then the surrogate URL will be expanded to ten separate URLs, and each of these URLs will be used to retrieve the relevant style sheet or script resource.

The handler will do this for each surrogate URL it receives at the time it receives it.

Once the handler has requested all the individual resource content identified by the numeric tokens in the surrogate URL, the individual content fragments are combined and compressed.

The content is then cached so that when the same surrogate URL request is made later, it is not necessary to go through the stages of expanding the surrogate URL and requesting full content of the resources.

The combined and compressed content is then streamed back to the browser via the web server.

The above described method and system avoids the need for the browser to send individual requests to the web server every time it comes across a resource in the HTML of the web page as it is being rendered. This is important as each request by the browser results in the web server requesting the resource, receiving the resource, and then forwarding the resource to the web browser. This reduces total latency and therefore the time taken to render a page.

Figure 4:
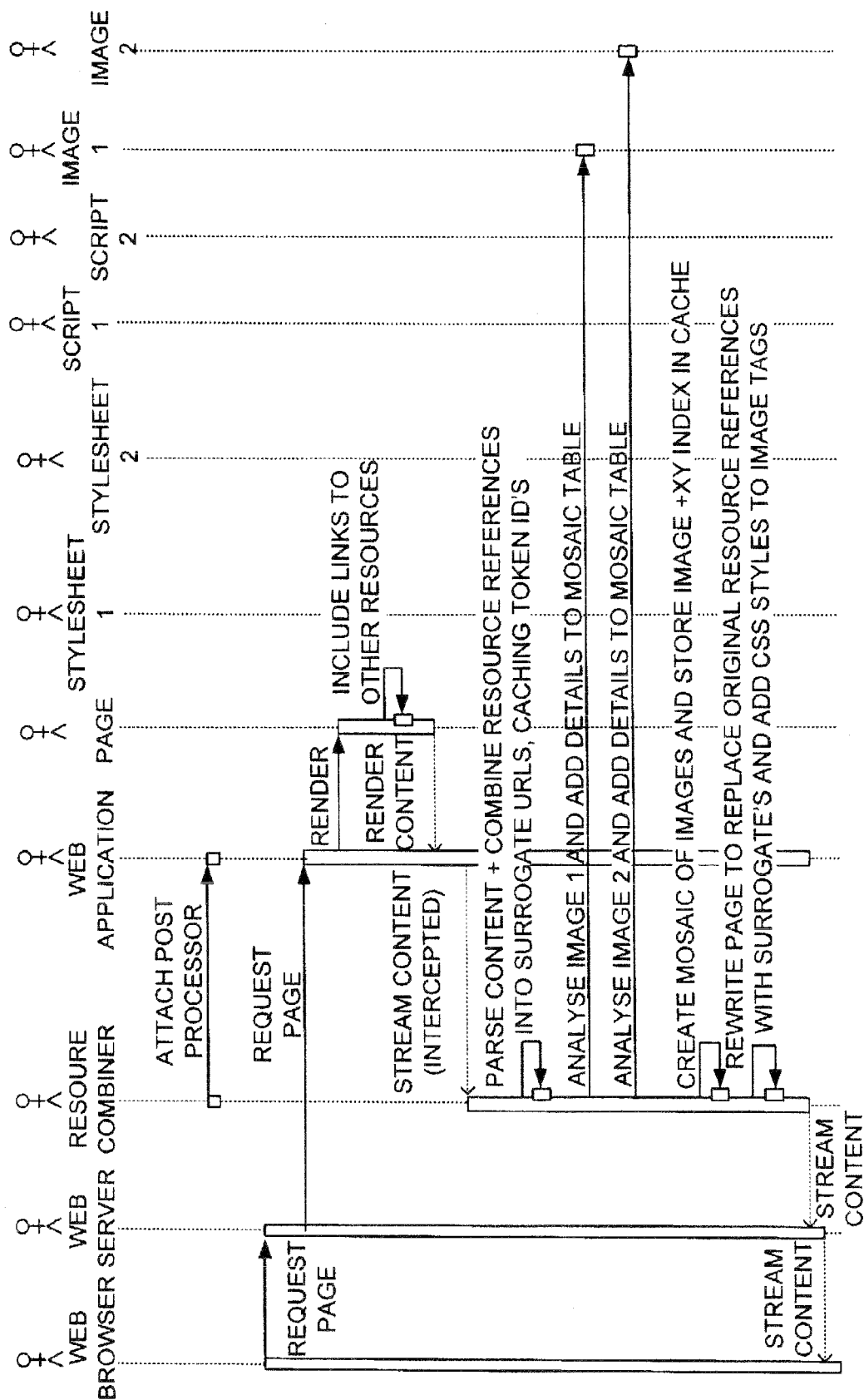
FIG. 4 shows a flow diagram of processing according to an embodiment of the present invention.

FIG. 4 shows a flow diagram of the post processing steps carried out by a resource combiner after a web application has rendered a web page according to this embodiment of the present invention.

The resource combiner in this embodiment of the invention is attached to the web application. When a web browser requests a web page from a web server, the web server requests the page from the web application. The web application renders the web page by requesting the web page data from its source and includes links to any resources within the web page. The web application then renders the content of the web page and streams the content.

The resource combiner intercepts the streamed content from the web application, parses the content for any resources that are referenced within the web page and combines the resources into a surrogate URL. Further the resource combiner provides a unique identification for any style sheet and script references, and stores those references along with the surrogate URL. Any images found are analysed and their details added to a mosaic table as well as creating a mosaic image, as described in more detail below. The web page is then rewritten by the resource combiner to replace the original resource references with a single reference for each type of resource by inserting surrogate URLs and adding style sheet (CSS) styles to image tags.

The resource combiner then streams the content of the web page back to the web server, which in turn streams the content back to the web browser.

Figure 5:
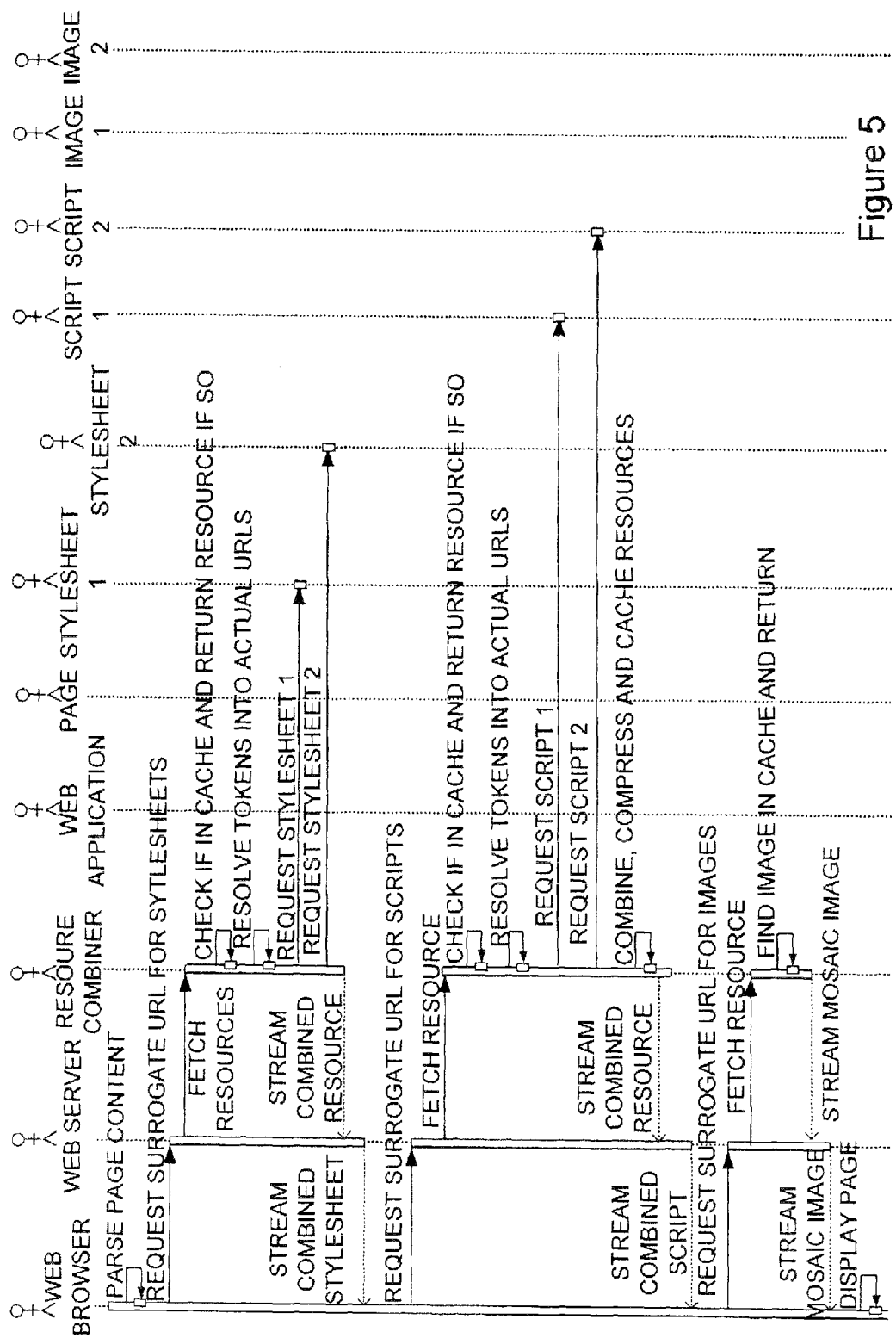
FIG. 5 shows a further flow diagram of processing according to an embodiment of the present invention.

FIG. 5 shows a flow diagram of the steps carried out by the resource combiner when it receives a request for a web page according to an embodiment of the present invention.

The web browser parses the page content and when it parses the surrogate URL for style sheets inserted into the content, a request is made to the web server. The web server receives the surrogate URL request and requests the resource from the resource combiner. The resource combiner checks to see if the resource is stored in cache memory, and if so, returns the resource. If the resource is not stored in cache, the tokens within the surrogate URL are resolved into actual URL's that identify the source of each of the resources. Each of the style sheets identified is then requested by the resource combiner from the style sheet source, and the combined resources are streamed back to the web server, and onto the web browser.

If the web browser parses a surrogate URL for scripts, similar steps to those described above for style sheets are carried out and the combined script resources are streamed to the web server from the resource combiner, and then onto the web browser.

If the web browser parses a surrogate URL for images, a request is made by the web browser. Upon receipt of the request, the web browser requests the resource from the resource combiner, which finds the images in its cache and streams back the mosaic image to the web server, which in turn streams the image back to the web browser.

The web browser then displays the full web page with all resources.

The above described embodiment specifically describes how script references and style sheet references may be combined. The following description explains how image references in the web page may also be combined so that the web browser is only required to make a single request in order to display multiple images.

The following shows a standard web page HTML without any changes made using the resource combiner, i.e. this is the page as passed to the combiner by a web application before optimisation:

```
<html>
    <head>
    </head>
    <body>
        <div>
            <p>Some content...</p>
            <img src="images/one.jpg"/>
            <p>Some more content...</p>
            <img src="images/two.jpg"/>
        </div>
    <body>
</html>
```

As the web browser parses the web page it is required to make two separate requests for each of the images, one.jpg and two.jpg, from the web server.

The following HTML shows the modified web page after it has been optimized by the resource combiner:

```
<html>
    <head>
        <style>
            img.arpo-jpgs { background-image:
            url(combinedresource.axd?id=image/jpg|1.4.29283|4); }
            img.arpo-img1 { background-position: 0 0; width: 80px;
            height: 40px; }
            img.arpo-img2 { background-position: 0 -40; width: 115px;
            height: 12px; }
        </style>
    </head>
    <body>
        <div>
            <p>Some content...</p>
            <img src="blank.gif" class="arpo-jpgs arpo-img1"/>
            <p>Some more content...</p>
            <img src="blank.gif" class="arpo-jpgs arpo-img2"/>
        </div>
    <body>
</html>
```

This format results in a request for a single mosaic image to be made by the browser from the web server.

The HTML includes the following components:

a) a style tag which references a mosaic of all the non excluded images within the web page:

img.arpo-jpgs {background-image: url(combinedresource.axd?id=image/jpg|1.4.29283|4);};

b) CSS attributes that include co-ordinate values for an image in order to define the position of the image within the mosaic image:

img.arpo-img1 {background-position: 0 0; width: 80 px; height: 40 px;} img.arpo-img2 {background-position: 0-40; width: 115 px; height: 12 px;};

and c) style attributes that reference the CSS attributes, and an identification of a blank (or transparent) image source, which overlays the projected image from the mosaic image:

```
<img src="blank.gif" class="arpo-jpgs arpo-img1"/>
<img src="blank.gif" class="arpo-jpgs arpo-img2"/>.
```

The img src="blank.gif" portion of the HTML creates a blank image, or foreground image, that lies over the top of the image identified within the mosaic image.

It is also possible in some browsers to use an inline data expression instead of an image reference to provide this 1×1 pixel blank image to further reduce the number of images requested by 1. This expression is in the form src="data: image/gif;base64,XXX" where XXX is base64 encoded binary image data.

In this embodiment, the resource combiner adds the styles to the web page in the head section of the page. However, it should be appreciated that the styles may also be appended or concatenated to other combined style sheet content so that only one request is made for the style sheet.

Figure 6:
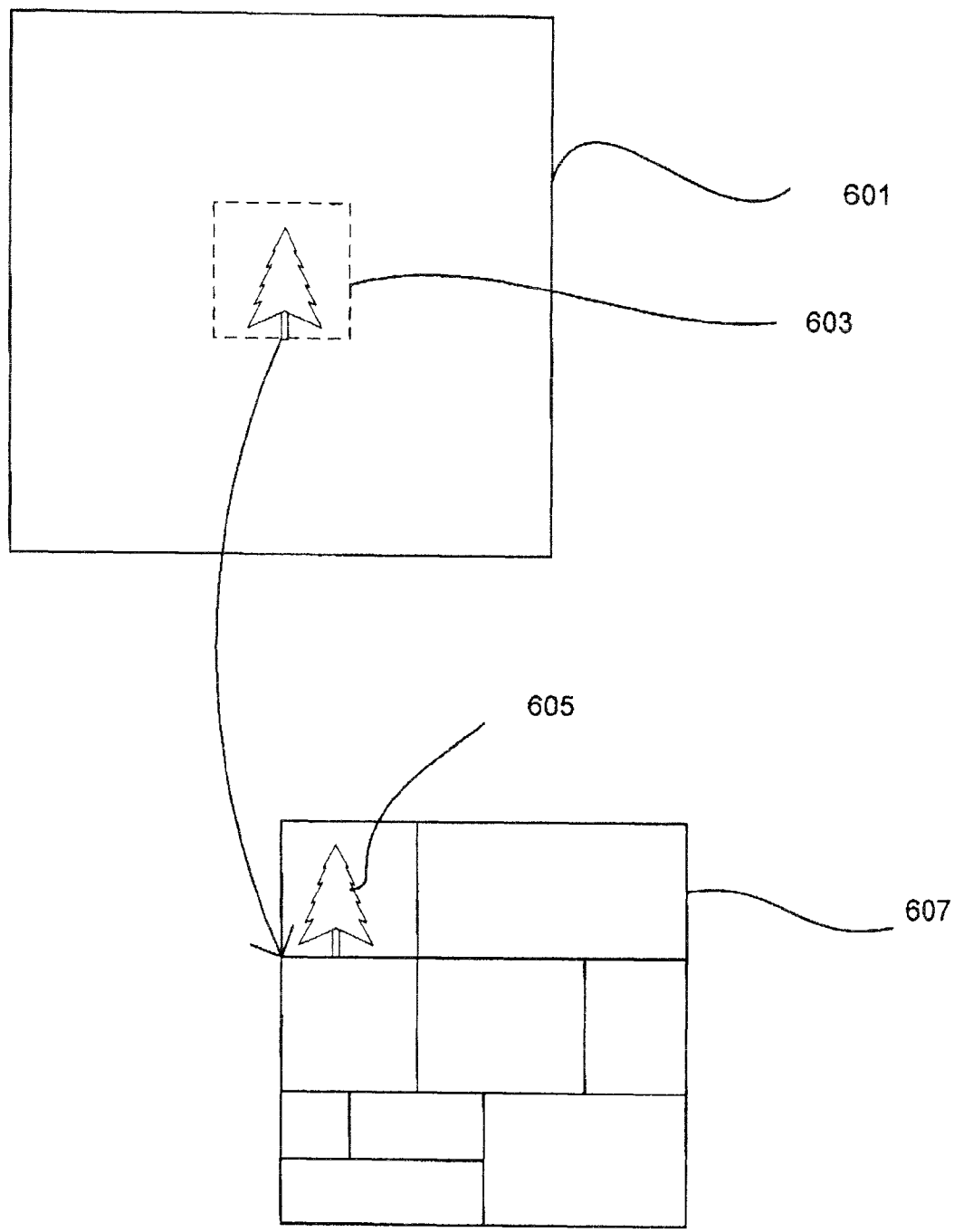
FIG. 6 shows a pictorial representation of a mosaic image and a web page being rendered according to an embodiment of the present invention.

FIG. 6 shows a pictorial representation of a mosaic image and a web page being rendered using the HTML described above.

A web page 601 includes a position 603 in the web page where an image is to be displayed. The image itself 605, a tree in this example, is stored within a mosaic image 607. The mosaic image contains all the non-excluded images referenced on the web page. The HTML provides a reference to the mosaic image and the location of the image within the mosaic image to enable a view window to be adapted that effectively positions itself over the required image. Therefore, as the view window is modified in its position and size, the other images in the mosaic image can be viewed.

An image may be excluded for any number of reasons. For example, any images that are displayed using the repeat function may be excluded.

Therefore, where the type of resource is an image, any identified images for each specific image format are grouped into a mosaic image. Therefore, for each of the image types JPEG, GIF etc, there will be one mosaic image. As an alternative, it is also possible to resample images of one type into another type such that only one type of image mosaic is required. For example, all GIF images may be converted into JPG images and included in a single JPG mosaic image.

A CSS style portion is created that provides a style reference for the identified image and references the mosaic image and defines the identified images. The identified image style reference includes a style tag that references the mosaic image and includes style sheet attributes for the identified image. The style sheet attributes include co-ordinate values for the identified image and the co-ordinate values defining the position of the image in the mosaic image as well as image size values for the identified image.

A table of non-excluded images is created, and any links to a non-excluded image resource are copied into the table.

A unique image reference including style attributes for each identified image are determined. Included within the unique image reference is a unique style sheet class that references style sheet attributes associated with the identified image. The unique image reference then replaces the link to the identified resource.

Specific embodiments provide the ability to reduce the number of requests for resources identified in a web page. The number of requests has been reduced to a minimum of a single request for each type of resource identified. The ability to post process web pages prior to them being sent back to the browser enables existing web pages to be modified in order to provide the discussed advantages. There is no requirement for web developers to adapt their methods of developing web pages in order to gain access to the advantages of the present invention.

Further, it should be appreciated that in a system where there is no web application, the web server may carry out the post processing described above. In this embodiment, the web server would retrieve the static resources from the file system and those resources would be combined using any of the methods as described above. That is, the module described is part of, or in communication with, the web server and processes the page rendered by the web server.

It should be appreciated that the module or device used to implement various embodiments may take different forms to those specifically disclosed above. Embodiments may be realised using a module or device that can intercept the rendered web page at any point prior to it being rendered at the web browser.

It should further be appreciated that the unique resource identification could be one of a unique series of numbers, letters or global identifiers.

It should also be appreciated that the embodiments described herein are by way of example only, and that various changes and modifications may be made without departing from the scope of invention.

What is claimed is:

1. A method of post processing a rendered HTML web page comprising:
   receiving the web page rendered by a server,
   parsing the web page to identify mark up language references that refer to resources,
   based on the identified mark up language resource references, combining a group of resources according to a type of resource, wherein the type of resource is one of a style sheet, script or image,
   creating a resource reference for each group of combined resources, and
   inserting the created resource reference into the web page to enable each group of resources referred to in the web page to be retrieved using a single resource request.

2. The method of claim 1 further comprising inserting a single resource reference for each group of resources in the web page.

3. The method of claim 1, wherein the resources are style sheets and the inserted resource reference is a style sheet reference that refers to a group of style sheet resources, the method further comprising:
   identifying the location of a first style sheet resource reference in the parsed web page, and
   inserting the style sheet reference at that location.

4. The method of claim 1, wherein the resources are scripts and the inserted resource reference is a script reference that refers to a group of script resources, the method further comprising:
   determining if the location of a first script resource reference is in a body section of the web page, and upon a positive determination, inserting the script reference at that location, and upon a negative determination, inserting the script reference at the location of a first occurrence of a script resource reference in a head section of the web page.

5. The method of claim 1, wherein the type of resource is a style sheet or script, the method further comprising:
   providing a unique resource identification for each resource, and
   storing the unique resource identification with the resource reference of the resource.

6. The method of claim 5, wherein the unique resource identification is one of a unique series of numbers, letters or global identifiers.

7. The method of claim 5, further comprising:
   including each unique resource identification within the resource reference.

8. The method of claim 1, wherein the type of resource is an image, the method further comprising:
   grouping the images for a specific image format into a mosaic image, creating an image style reference that references the mosaic image and defines the images.

9. The method of claim 8, further comprising:
   creating a single mosaic image for each image format.

10. The method of claim 8, further comprising:
    defining a unique image reference for each image.

11. The method of claim 1, further comprising:
    receiving a web page rendered by a web server, wherein the web server intercepted the rendered web page prior to the web page being sent to a web browser.

12. The method of claim 1, further comprising:
    receiving the web page rendered by a web application, wherein the web application intercepted the rendered web page prior to the web page being sent to a web server.

13. The method of claim 1 further comprising:

receiving the web page from a web server via a proxy server, where the proxy server has intercepted the rendered web page after the web server has sent the web page to a web browser.

14. The method of claim 1, further comprising:

determining if the identified resource reference refers to an excluded resource.

15. A method of handling a resource request from a web browser, comprising:

receiving the resource request, wherein the resource request includes one or more mark up language resource references, each resource reference referring to a group of resources of one type, wherein the type is one of a style sheet, script or image, requesting at least two of the resources in the group, combining the at least two resources, and sending the combined resources to the web browser.

16. The method of claim 15, further comprising:

determining if the requested resources are stored locally, and, upon a negative determination, retrieving the requested resources and storing the requested resources locally.

17. The method of claim 15, further comprising:

identifying the type of resource in the resource reference, and where the type of resource is identified as a style sheet or script, the method further comprising:

determining unique resource identifications from the resource reference, and retrieving each identified resource associated with each unique resource identification.

18. The method of claim 17, further comprising:

retrieving each identified resource by resolving the unique resource identification into an individual uniform resource locator associated with the identified resource, and retrieving the identified resource using the individual uniform resource locator.

19. The method of claim 18, further comprising:

combining all retrieved resources for one type of identified resource.

20. The method of claim 15, further comprising:

identifying the type of resource in the resource reference, and where the type of resource is identified as an image, the method further comprising:

determining a reference to a mosaic image from the resource reference, and retrieving the mosaic image.

* * * * *